United States Patent
Newman

(10) Patent No.: US 6,260,512 B1
(45) Date of Patent: Jul. 17, 2001

(54) WILDLIFE HABITAT

(75) Inventor: Warren Newman, Edna, TX (US)

(73) Assignee: Utility Habitat, Edna, TX (US)

( * ) Notice: Subject to any disclaimer, the term of this patent is extended or adjusted under 35 U.S.C. 154(b) by 0 days.

(21) Appl. No.: 09/247,357

(22) Filed: Feb. 10, 1999

(51) Int. Cl.[7] .............................. A01K 31/00; E04C 3/30
(52) U.S. Cl. ............................................. 119/433; 119/428
(58) Field of Search ..................................... 119/433, 428, 119/429, 57.8, 57.9; 52/649.2, 721.2, 723.1, 722.1, 736.1, 732.1, 731.2, 732.3

(56) References Cited

U.S. PATENT DOCUMENTS

| | | | |
|---|---|---|---|
| 822,499 | * | 6/1906 | Ancona . |
| 3,646,911 | * | 3/1972 | Parson .................................. 119/57.8 |
| 5,022,349 | * | 6/1991 | Bryant et al. ........................ 119/57.8 |
| 5,103,768 | * | 4/1992 | Slowinski ............................. 119/428 |
| 5,215,039 | * | 6/1993 | Bescherer ............................ 119/57.8 |
| 5,235,935 | * | 8/1993 | Edwards .............................. 119/57.8 |
| 5,285,614 | * | 2/1994 | Fouad . |
| 5,572,949 | * | 11/1996 | Bryant, Jr. et al. ............... 119/57.91 |
| 5,671,696 | * | 9/1997 | Liethen ................................ 119/57.8 |
| 5,761,875 | * | 6/1998 | Oliphant et al. .................... 52/721.2 |
| 6,016,768 | * | 1/2000 | Colucci ................................ 119/57.9 |

* cited by examiner

Primary Examiner—Charles T. Jordan
Assistant Examiner—Yvonne R. Abbott
(74) Attorney, Agent, or Firm—Williams, Morgan & Amerson, P.C.

(57) ABSTRACT

An apparatus includes a pole and a bottom surface. The pole has a sidewall with an inner surface that defines a hollow raceway. The sidewall defines a first opening. The first opening extends through the sidewall and communicates with the hollow raceway of the pole. The bottom surface is positioned inside the hollow raceway of the pole proximate the first opening. A method for constructing a wildlife habitat includes forming at least a first opening in a sidewall of a pole. The sidewall has an inner surface that defines a hollow raceway. The first opening communicates with the hollow raceway. A bottom surface is provided inside the hollow raceway of the pole proximate the first opening.

33 Claims, 5 Drawing Sheets

Section A-A

WILDLIFE HABITAT

BACKGROUND OF THE INVENTION

1. Field of the Invention

This invention relates generally to the construction of wildlife habitats, and, more particularly, to constructing wildlife habitats of various sizes and shapes inside of poles and towers utilized for utility and non-utility functions.

2. Description of the Related Art

Poles and towers of different shapes and sizes are commonly used in a variety of applications to suspend various pieces of equipment and other components above ground. For example, poles and towers are currently used for supporting communication equipment, high area lighting, and in utility applications, such as power transmission and distribution. Utility applications require an enormous volume of poles to support transmission and distribution power lines. Today, a significant number of utility transmission and distribution power line systems utilize wood pole construction. In addition, a large amount of the high area lighting, such as sporting event lighting, highway lighting, and ornamental lighting, utilize wood pole construction.

For various reasons, many utility and non-utility poles and towers deteriorate prematurely. One substantial cause of pole and tower deterioration is wildlife animals, such as woodpeckers. Often, woodpeckers and other wildlife animals make their homes in large holes that they have burrowed inside of a pole or tower, such as a wood utility pole, which may result in the pole or tower suffering from reduced reliability or rapid deterioration. In addition, the problem may be exacerbated when wood poles, such as power transmission and distribution poles, are erected in rural areas having a large wildlife population.

One method currently used to increase the reliability of applications using poles and towers and to prevent pole destruction by wildlife animals is to replace old poles and towers with new poles and towers made of stronger more durable materials such as, steel, fiberglass, concrete, and composite or aggregate material. Concrete poles tapered and shaped similarly to conventional wood poles may be used to replace failing wood poles in existing systems, such as power transmission and distribution. Typically, the concrete poles are made with a hollow center, which reduces the weight and cost of the pole.

Concrete poles are extremely durable and are typically capable of repelling any undesirable activity from wildlife animals. Unfortunately, wildlife animals are usually not easily discouraged from making their homes in poles and towers. For instance, most wildlife animals, such as birds, reptiles, mammals, etc., living inside wood poles that are replaced with concrete poles move to the next nearest wood pole and reestablish their home. The process of wildlife animals making their home in the next available wood pole is generally a repeated cycle regardless of the number of wood poles that are replaced with concrete poles in a given area.

The present invention is directed to overcoming, or at least reducing the effects of, one or more of the problems set forth above.

SUMMARY OF THE INVENTION

One aspect of the present invention is an apparatus including a pole. The pole has a sidewall with an inner surface that defines a hollow raceway. The sidewall defines a first opening. The first opening extends through the sidewall and communicates with the hollow raceway of the pole. The bottom surface is positioned inside the hollow raceway of the pole proximate the first opening.

Another aspect of the present invention is seen in a method for constructing a wild life habitat. The method includes forming at least a first opening in a sidewall of a pole. The sidewall has an inner surface that defines a hollow raceway. The first opening communicates with the hollow raceway. A bottom surface is provided inside the hollow raceway of the pole proximate the first opening.

BRIEF DESCRIPTION OF THE DRAWINGS

The invention may be best understood by reference to the following description taken in conjunction with the accompanying drawings, in which like reference numerals identify like elements, and in which.

Figure 1:
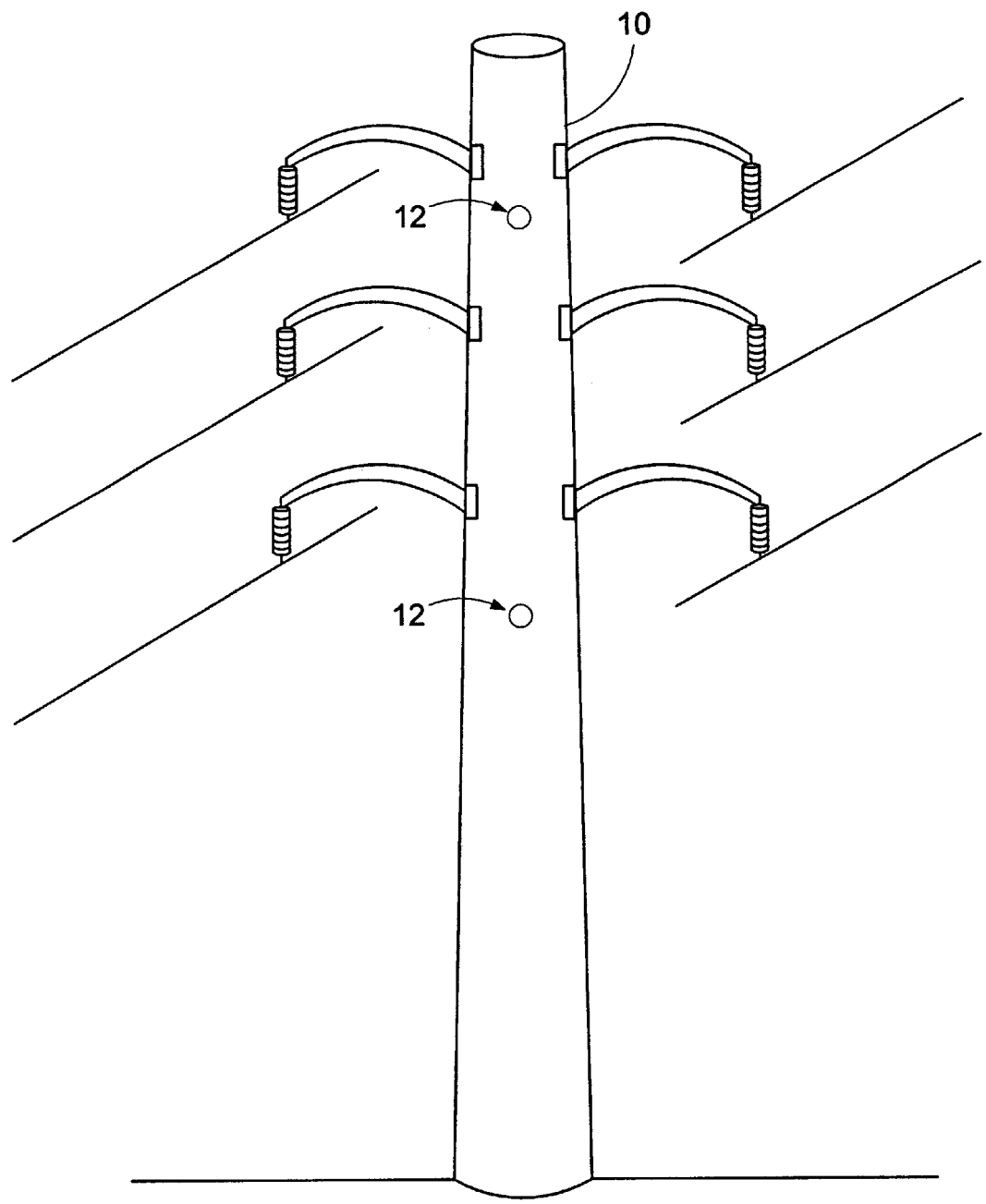
FIG. 1 illustrates an electric utility pole comprising one embodiment of a wildlife habitat in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates a utility pole 10 employing one illustrative embodiment of a wildlife habitat 12 in accordance with the present invention. The utility pole 10 may be constructed from a variety of materials, such as wood, steel, fiberglass, or any other rigid material. In one embodiment, the utility pole 10 is constructed from centrifugally cast (spun) concrete. It is contemplated that the pole 10 may be cast in a variety of shapes and lengths. For example, the pole 10 may have a cross-section that is square, rectangular, circular, etc. In one embodiment, the pole 10 is circular in cross-section and is tapered with the top of the pole 10 more narrow than its base.

It is contemplated that the wildlife habitat 12 may be constructed inside a variety of poles and that the poles may be used in a variety of applications. For example, the poles 10 may be used to support communication equipment, high area lighting, or any other application requiring the elevation of equipment or components.

The wildlife habitat 12 may be located anywhere along the pole 10. In addition, the pole 10 may comprise a plurality of wildlife habitats 12 that may be positioned in a plurality of locations along the pole 10. It is contemplated that the number of wildlife habitats 12 per pole 10 may vary depending upon the application. In addition, the pole 10 may be erected on land or in water, such as a lake or pond. Furthermore, a portion of the pole 10 may be positioned above the waterline and a portion of the pole 10 may be positioned below the waterline. It is contemplated that the wildlife habitat 12 may be positioned above the waterline, below the waterline, or the pole 10 may comprise several wildlife habitats 12 positioned above or below the waterline. In one embodiment, the pole 10 comprises one wildlife habitat 12 positioned near the top of the pole 10, and the wildlife habitat 12 may accommodate a variety of warm-blooded and cold-blooded animals, such as birds, reptiles, and mammals.

Figure 2:
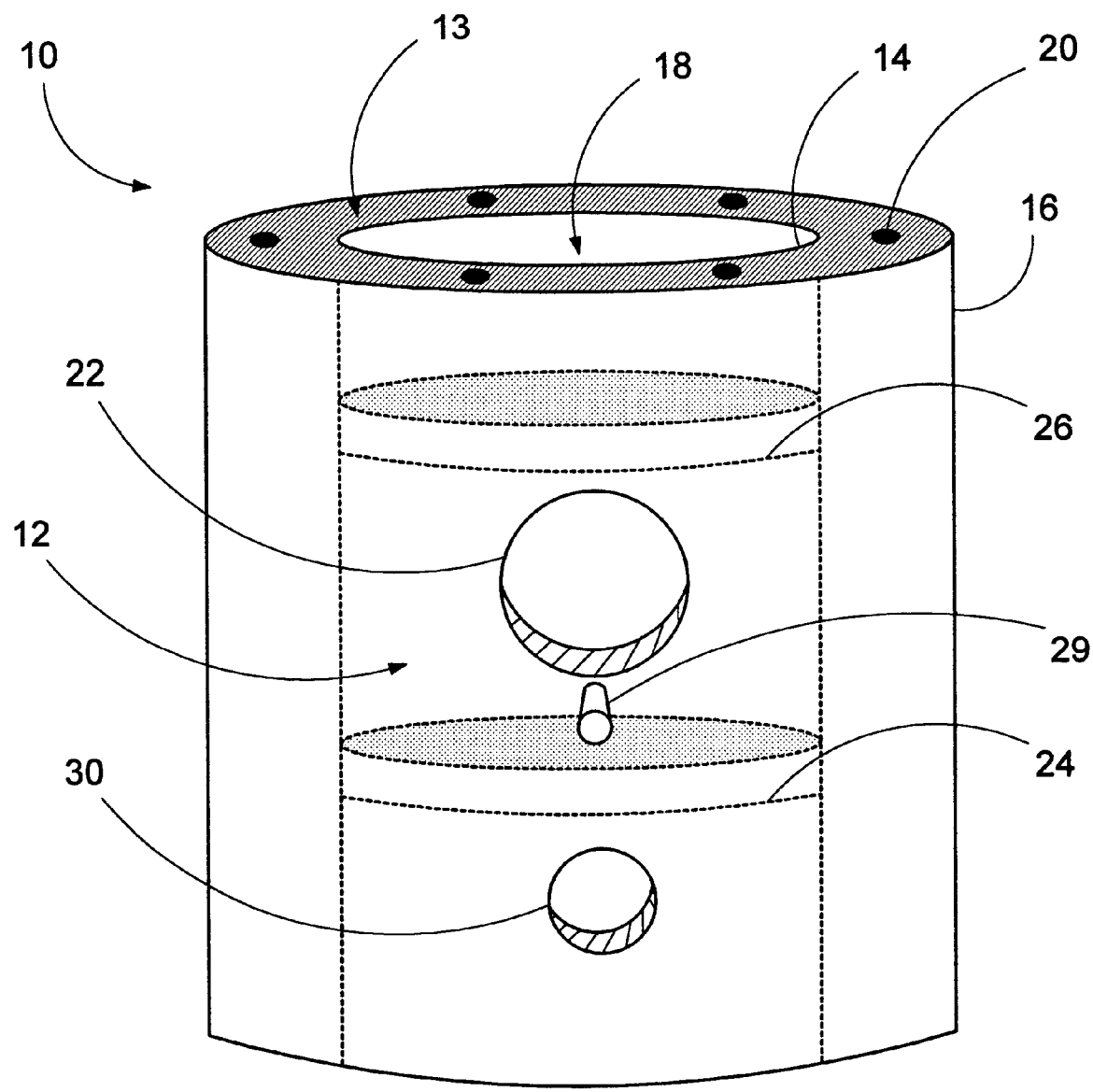
FIG. 2 is an illustrative specific embodiment of the utility pole and wildlife habitat shown in FIG. 1.

Referring to FIG. 2, a section of the pole 10 is provided with an illustrative specific embodiment of the wildlife habitat 12. The pole 10 has a concrete sidewall 13 that is comprised of an inner and outer surface 14, 16 and a hollow raceway 18 that is defined by the inner surface 14. Between the inner and outer surfaces 14, 16, steel strands 20 run the length of the pole 10. The steel strands 20 are embedded in concrete and provide mechanical support for the pole 10. Those skilled in the art will appreciate that the diameter of the steel strands 20 may vary depending upon the application. In one embodiment, the diameter of the steel strands 20 is between 3/8 and 9/16 inches and the steel strands 20 are interwoven with spiral steel wire (not shown). Furthermore, the spiral steel wire (not shown) is also embedded in the concrete between the inner and outer surfaces 14, 16. In one embodiment, the spiral steel wire (not shown) has a diameter between 5/32 and 3/16 inches.

In one embodiment, the wild life habitat 12 comprises a first opening 22, a bottom surface 24, and a top surface 26. Because the pole 10 is formed with the hollow raceway 18, the first opening 22 communicates with a cavity 28 that is formed between the inner surface 14, the bottom surface 24, and the top surface 26. It is contemplated that additional openings may be constructed in the pole 10 to provide wildlife animals additional access to the wildlife habitat 12. In addition, a perch 29 may be positioned proximate the first opening 22. In one embodiment, the perch 29 is positioned below the first opening 22, as shown in FIG. 2.

The perch 29 may be comprised of a variety of materials and implemented in a variety of shapes, and the particular shape and materials selected may vary depending upon the application. For example, the perch 29 may be comprised of metal, wood, plastic, or any other material suitable for supporting a wildlife animal, such as a bird, and the perch 29 may be cylindrical, rectangular, flat, or any other shape. In addition, the dimensions of the perch 29, such as the distance the perch 29 extends out away from the outer surface 16 of the pole 10, may vary depending upon the application. Furthermore, the perch 29 may be attached to the pole 10 using a variety of methods, and the particular method selected may vary depending upon the application.

In one embodiment, the perch 29 may be tapered along its length and comprised of plastic. An opening (not shown) may be drilled or formed in the pole 10 at the desired location of the perch 29, and the perch 29 may be friction fit into the opening, as shown in FIG. 2. Alternatively, it is contemplated that the perch 29 may be attached to the first opening 22 using clamps, adhesive, or any other means suitable for securely attaching the perch 29.

The first opening 22 may be constructed in a variety of ways and in a variety of shapes. In one embodiment, the first opening 22 is circular and is field drilled using a rotor hammer drill with a carbide-tipped bit. Alternatively, the first opening 22 may be pre-drilled before the pole 10 leaves the manufacturing facility. It is contemplated that the diameter of the first opening 22 may be varied depending on the application. For example, the diameter of the first opening 22 may be selected to accommodate a certain type of wildlife animal, such as a woodpecker. In addition, the diameter of the first opening 22 may be selected in a manner that prevents certain types of wildlife animals from entering the wildlife habitat 12 while still permitting access to other wildlife animals. For example, the diameter of the first opening 22 may be selected to prevent squirrels from entering and disturbing a woodpecker's nest.

In one embodiment, the first opening 22 may be formed while manufacturing the pole 10. It is contemplated that a mold filler (not shown) with a length at least as great as the distance between the inner and outer surfaces 14, 16 may be placed in the forms used to cast the concrete poles 10. The mold filler (not shown) establishes the location and shape of the first opening 22 by preventing concrete from gathering in the location of the mold filler during the formation of the pole 10. Once the pole 10 is formed, the mold filler (not shown) may be removed and the first opening 22 is revealed. In this manner, the first opening 22 for the wildlife habitat 12 may be formed without drilling into the pole 10.

The bottom surface 24 of the wildlife habitat 12 is shown, in FIG. 2, below the first opening 22. It is contemplated that the bottom surface 24 may be positioned any distance below the first opening 22 and that the location of the bottom surface 24 may vary depending upon the application. Furthermore, the bottom surface 24 may be comprised of a variety of materials, such as polystyrene (e.g., Styrofoam®) produced by The Dow Chemical Company), rubber, plastic, wood, concrete or any other material suitable for providing a surface for housing wildlife animals.

In one embodiment, the bottom surface 24 is comprised of expandable foam. Typically, expandable foam expands rapidly when exposed to the natural environment, and it is typically used to fill small crevices and provide insulation. It is contemplated that expandable foam may be applied through the first opening 22 of the wildlife habitat 12. One method used to apply the expandable foam is with an aerosol can. The aerosol can may be filled with expandable foam and have a tube attached to the nozzle of the can for dispensing the expandable foam. Because the foam expands rapidly, the expandable foam may attach itself during the application process to the inner surface 14 of the pole 10. Once attached to the inner surface 14 of the pole 10, the expandable foam creates a substantially planar bottom surface 24.

Because the pole is tapered, the hollow raceway 18 may be too wide in portions of the pole 10 for the expandable foam to attach itself to the inner surface 14 of the pole 10 using the application method presented above. To alleviate this problem, it is contemplated that a second opening 30 may be constructed in the pole 10 below the desired location of the bottom surface 24. The second opening 30 may be used to insert a support member in the pole 10 to provide temporary or permanent support for the bottom surface 24. In one embodiment, the support member is a deflated balloon (not shown) that may be inserted through the second opening 30. Once inserted through the second opening 30, the balloon (not shown) may be inflated. The inflated balloon (not shown) may provide temporary support so that the expandable foam may span the hollow raceway 18 and attach itself to the inner surface 14 of the pole 10. Again, once attached to the inner surface 14 of the pole 10, the expandable foam solidifies into a substantially planar bottom surface 24.

The top surface 26 of the wildlife habitat 12 is shown, in FIG. 2, above the first opening 22. It is contemplated that in one embodiment the top surface 26 may be eliminated. For example, in one embodiment the wild life habitat may be comprised of the inner surface 14 of the pole 10, the bottom surface 24, and the first opening 22.

The top surface 26 may be comprised of a variety of materials, such as polystyrene (e.g., Styrofoam® produced by The Dow Chemical Company), concrete, rubber, plastic, wood, or any other material suitable for wildlife animals, and because the pole 10 is tapered, the top surface 26 may have a diameter that is less than the diameter of the bottom surface 24. In one embodiment, the top surface 26 is comprised of expandable foam. It is contemplated that the expandable foam used to form the top surface 26 may be applied in a similar manner as was discussed for the bottom surface 24. In one embodiment, the expandable foam is applied through the top of the pole 10. Alternatively, although not shown, it is contemplated that openings similar to the second opening 30 may be constructed in the pole 10 above the first opening 22 to aid in the formation of the top surface 26. Furthermore, in a similar manner as was discussed for the bottom surface 24, a support member may be inserted through the sidewall 13 of the pole 10 proximate the top surface 26 providing temporary or permanent support for the top surface 26.

It is contemplated that once the bottom and top surfaces 24, 26 are positioned or constructed, any openings in the pole 10 besides the first opening 22, such as the second opening 30, may be plugged or filled. For example, the second opening 30 may be plugged with a variety of materials, such as wood, rubber, concrete, steel, and other like materials. In one embodiment, the second opening 30 is filled with mortar, and the mortar is applied in a manner that is substantially level and coplanar with the outer surface 16 of the pole 10.

In one embodiment, the bottom and top surfaces 24, 26 may be inserted into position through either the top or base of the pole 10. Because the pole 10 is tapered, the bottom and top surfaces 24, 26 may be wedged into place from the bottom 16 of the pole 10. For example, in one embodiment, the top surface 26 may be inserted and wedged into place prior to inserting the bottom surface 24 into the pole 10. By constructing the top surface 26 with a diameter less than the bottom surface 24, the top surface 26 may be wedged securely above the first opening 22 while the bottom surface 24 having a larger diameter is wedged securely below the first opening 22.

It is contemplated that a variety of methods may be used to securely wedge the bottom and top surfaces 24, 26 into position inside the pole 10. In one embodiment, long rods may be used to wedge the bottom and top surfaces 24, 26 into proper position. In addition, the rods may be used to guide the bottom and top surfaces 24, 26 through the hollow raceway 18 of the pole 10. Once the bottom and top surfaces 24, 26 have been positioned inside the pole 10, the rods may be retracted and removed from inside the hollow raceway 18. Furthermore, adhesive may be used to provide additional support for the bottom and top surfaces 24, 26. For example, adhesive may be applied to the portions of the bottom and top surfaces 24, 26 that contact the inner surface 14 of the pole 10.

In one embodiment, the bottom and top surfaces 24, 26 may be constructed while manufacturing the pole 10. It is contemplated that the bottom and top surfaces 24, 26 may be placed inside the pole 10 prior to forming the concrete inner and outer surfaces 14, 16. For example, in one embodiment, the bottom and top surfaces 24, 26 may be wedged between or attached to the steel strands 20 or spiral steel (not shown) prior to casting the pole 10 in concrete. In addition, the first opening 22 may also be formed while manufacturing the pole by placing mold fillers in the forms used to cast the pole 10 in concrete as was described above.

Figure 3:
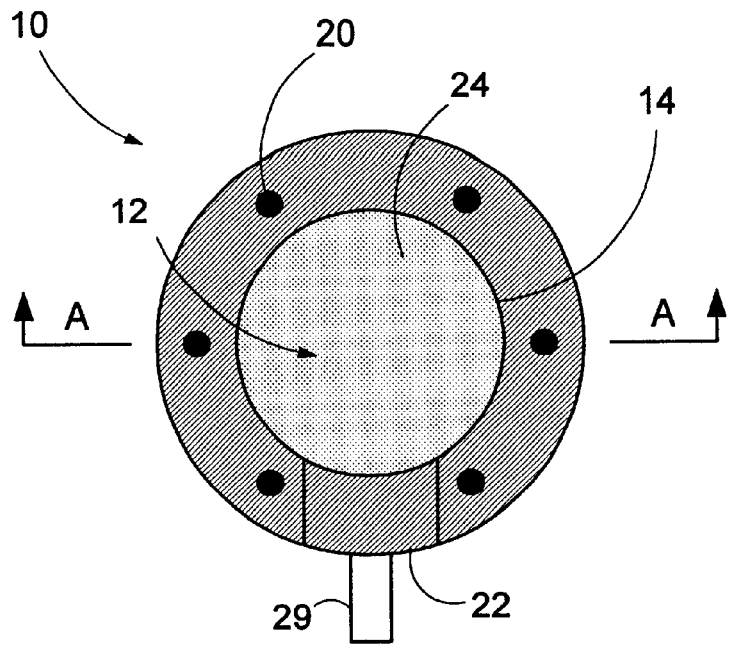
FIG. 3 is a top view of the utility pole and wildlife habitat shown in FIG. 2.

FIG. 3 illustrates a cross-sectional top view of the wildlife habitat 12 and the pole 10 shown in FIG. 2. In one embodiment, the first opening 22 is positioned between the steel strands 20 that run the length of the pole 10. By positioning the first opening 22 between the steel strands 20, the wildlife habitat 12 may be constructed without substantially reducing the strength of the pole 10. In addition, the spiral wire (not shown) that is embedded between the inner and outer surfaces 14, 16 may be severed while constructing the first opening 22 without substantially reducing the strength of the pole 10. In one embodiment, multiple openings may be constructed between the steel strands 20 to provide additional access to the wildlife habitat 12. The bottom surface 24 is shown with its outer edge contacting the inner surface 14 of the pole 10. It is contemplated that the bottom surface 24 may be constructed in a manner that does not completely span the hollow raceway 18 of the pole 10 (i.e., the bottom surface 24 does not completely contact the inner surface 14 of the pole 10.) Again, the wildlife habitat 12 may be constructed with or without the top surface 26.

Figure 4:
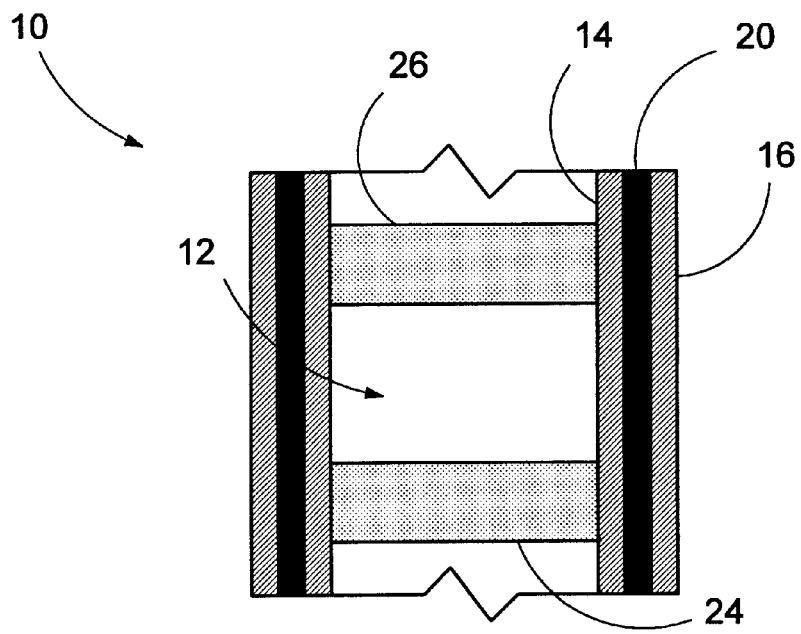
FIG. 4 is a cross-sectional view of the utility pole and wildlife habitat shown in FIG. 2.

FIG. 4 illustrates a cross-sectional side view of the pole 10 and wildlife habitat 12 shown in FIG. 2. The wildlife habitat 12 is bounded by the bottom, top and inner surfaces 24, 26, and 14. The bottom and top surfaces 24, 26 are shown to completely span hollow raceway 18 of the pole 10. It is contemplated that the bottom and top surfaces 24, 26 may be constructed in a manner that does not completely span the hollow raceway 18 of the pole 10 (ie., the bottom and top surfaces 24, 26 do not completely contact the inner surface 14 of the pole 10.) Again, the steel strands 20 are shown to run the length of the pole 10, and in one embodiment, the openings made in the pole 10, such as the first opening 22, are constructed in a manner that does not disturb the steel strands 20.

Figure 5:
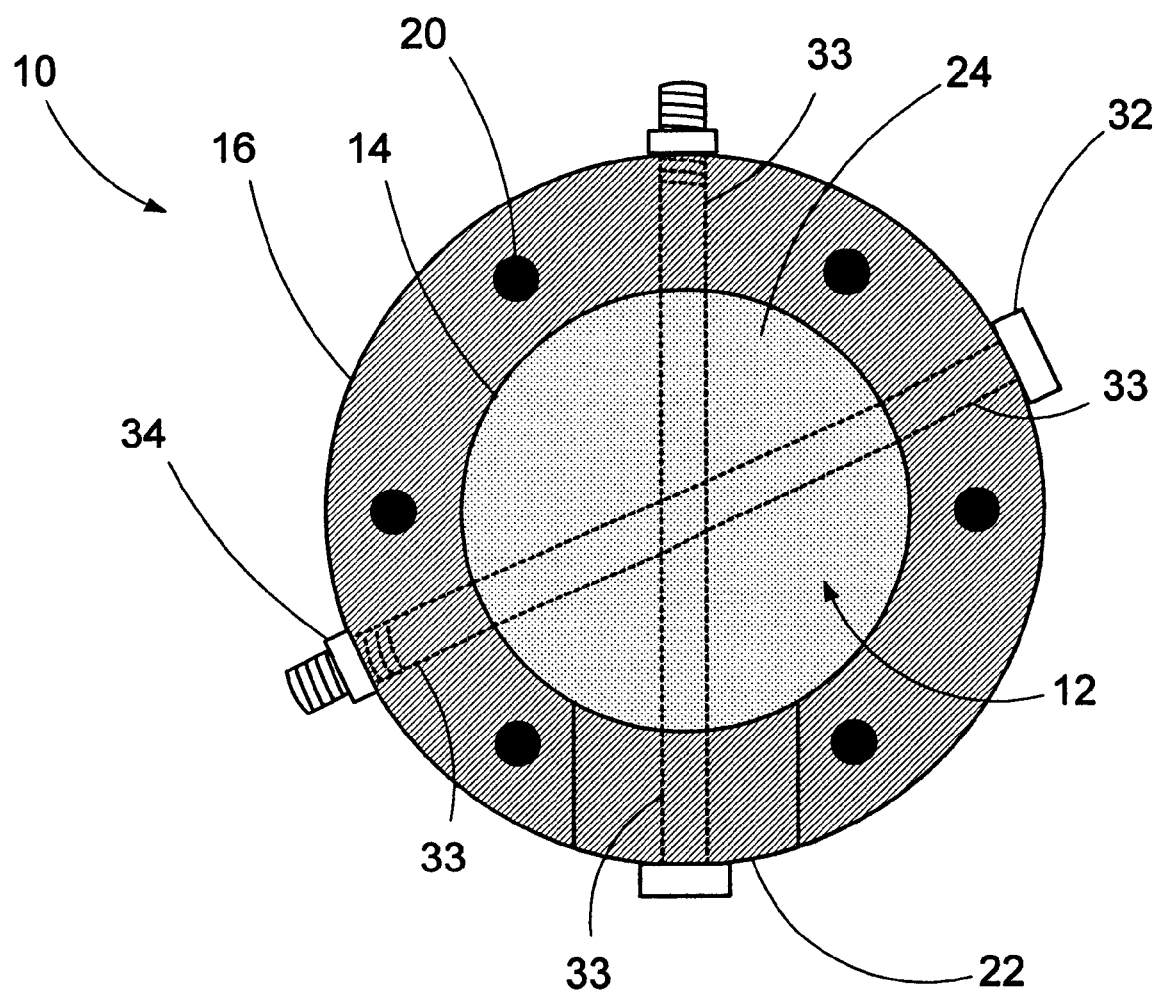
FIG. 5 is a top view of an illustrative specific embodiment of the utility pole and wildlife habitat shown in FIG. 2 in accordance with the present invention.

FIG. 5 shows a top view of one illustrative embodiment of the wildlife habitat 12 shown in FIG. 2. It is contemplated that a variety of support members may support the bottom surface 24 and top surface 26 inside the hollow raceway 18 of the pole 10. In one embodiment, bolts 32 may support the bottom surface 24 of the wildlife habitat 12. Those skilled in the art will appreciate that a variety of bolts 32 may be used to support the bottom surface 24 of the wildlife habitat 12, such as toggle bolts, U bolts, etc. In addition, the bolts 32 may be comprised of a variety of materials, such as steel, plastic, aluminum, stainless steel, etc. In one embodiment, conventional steel bolts 32 pass completely though the pole 10 and are secured by conventional nuts 34. The bottom surface 24 may be positioned to rest on top of the bolts 32. Alternatively, the bolts 32 may provide support by penetrating the bottom surface 24. In a similar manner, bolts 32 may also be used to support the top surface 26 of the wildlife habitat 12.

Openings 33 in the pole 10 for the bolts 32 may be field drilled using a rotor hammer drill with a carbide-tipped bit. In addition, the openings 33 for the bolts 32 may be pre-drilled before the pole 10 leaves the manufacturing facility. Alternatively, it is contemplated that the openings for the bolts 32 may be formed by placing mold fillers in the forms used to cast the pole 10 in concrete, as was described previously for the first opening 22. As shown in FIG. 5, the location of the bolts 32 may be determined in a manner that does not disturb the steel strands 20.

In one embodiment, wire (not shown), such as safety wire or any other rigid wire, may be inserted into the pole 10 through the openings 33. The wire may enter and exit the pole 10 through the openings 33 in a similar manner as shown for the bolts 32. Once inserted, the wire may be secured to support the bottom surface 24 of the wildlife habitat 12. For example, the ends of the wire may be twisted together.

Figure 6:
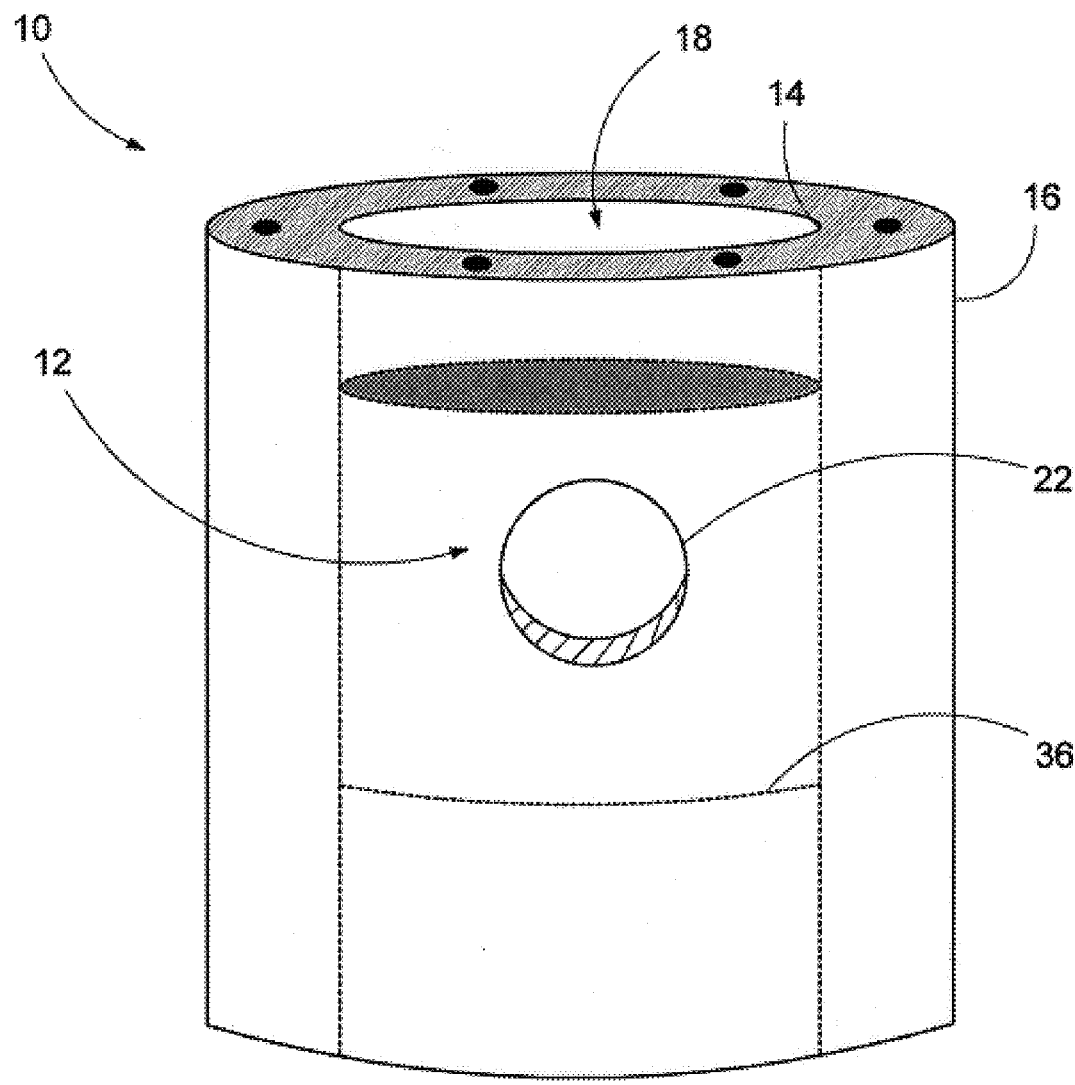
FIG. 6 is another illustrative specific embodiment of the utility pole and wildlife habitat shown in FIG. 1 in accordance with the present invention.

FIG. 6 shows a section 36 of a pole that has been inserted through the top or bottom opening of the pole 10. It is contemplated that the section 36 may be comprised of a variety of materials. In one embodiment, the section 36 is comprised of wood and is a portion of a pole that has been damaged by a wildlife animal. For example, rather than discarding the entire pole, a section 36 of the damaged pole, in which an animal has made its home, may be inserted through the hollow raceway 18 of the new pole 10 and used as a wildlife habitat 12.

It is contemplated that the section 36 may have various lengths and diameters. Because the pole 10 is tapered, the diameter of the section 36 may limit it to a specific location in the hollow raceway 18 of the pole 10. Alternatively, the section 36 may be modified to fit a particular location in the hollow raceway 18 of the pole 10. Furthermore, the section 36 may be positioned and supported in the hollow raceway 18 using any of the methods discussed previously. For example, the section 36 may be supported by bolts, adhesive, friction, etc. In addition, multiple sections 36 may be used in a single pole 10 and the number of sections 36 per pole 10 may vary depending upon the application.

Once the section 36 is positioned in the pole 10, the first opening 22 may be drilled in the pole 10 to provide wildlife animals access to the section 36. In addition, the first opening 22 may be pre-drilled or formed with mold fillers while manufacturing the pole 10. If the first opening 22 is formed prior to inserting the section 36, the section 36 may be inserted inside the pole 10 and aligned with the first opening 22.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
a utility pole for supporting at least one of electrical power delivery equipment, area lighting equipment, and communication equipment, the utility pole having a sidewall with an inner surface that defines a hollow raceway, the sidewall defining a first opening, the first opening extending through the sidewall and communicating with the hollow raceway of the utility pole; and
a bottom surface positioned inside the hollow raceway of the utility pole proximate the first opening.

2. The apparatus of claim 1, further comprising a top surface positioned inside the hollow raceway above the first opening in the utility pole.

3. The apparatus of claim 2, wherein the top surface comprises at least one of concrete, rubber, wood, polystyrene, plastic, metal, and expandable foam.

4. The apparatus of claim 1, wherein the utility pole is substantially formed of concrete and is substantially circular in cross-section.

5. The apparatus of claim 1, wherein the hollow raceway is tapered along its length, and the bottom surface is constructed with internal dimensions slightly larger than the internal dimensions of at least a portion of the hollow raceway, and the bottom surface is wedged inside the hollow raceway against the inner surface of the utility pole.

6. The apparatus of claim 1, further comprising a support member adapted to support the bottom surface inside the hollow raceway of the utility pole.

7. The apparatus of claim 1, further comprising means for supporting the bottom surface inside the hollow raceway of the utility pole.

8. The apparatus of claim 1, further comprising at least one bolt supporting the bottom surface, wherein at least a portion of the bolt is inserted into the hollow raceway through at least a second opening in the utility pole.

9. The apparatus of claim 1, wherein a first and second bolt are inserted through at least a second and third opening in the utility pole with at least a portion of the first and second bolts positioned inside the hollow raceway, the first and second portions being of a length sufficient that the first bolt overlaps the second bolt.

10. The apparatus of claim 1, further comprising a perch positioned proximate the first opening.

11. An apparatus comprising:
a pole having a sidewall with an inner surface that defines a hollow raceway, the sidewall defining a first opening, the first opening extending through the sidewall and communicating with the hollow raceway of the pole; and
a bottom surface positioned inside the hollow raceway of the pole proximate the first opening;
a balloon supporting the bottom surface, wherein the balloon is inserted into the pole through a second opening and inflated filling at least a portion of the hollow raceway.

12. The apparatus of claim 1, further comprising adhesive applied between at least a portion of the inner surface of the utility pole and at least a portion of an outer edge of the bottom surface.

13. The apparatus of claim 1, wherein the bottom surface comprises at least one of concrete, rubber, wood, polystyrene, plastic, metal, and expandable foam.

14. An apparatus, comprising:
a pole having a sidewall with an inner surface that defines a hollow raceway, the sidewall defining a first opening, the first opening extending through the sidewall and communicating with the hollow raceway of the pole; and a bottom surface positioned inside the hollow raceway of the pole proximate the first opening, wherein the bottom surface is a section of wood having a length less than the length of the pole, and the section of wood extends above and below the first opening.

15. The apparatus of claim 14, wherein the section of wood is constructed from at least a portion of a wood pole.

16. A wildlife habitat, comprising:

a utility pole for supporting at least one of electrical power delivery equipment, area lighting equipment, and communication equipment the utility pole having a sidewall with an inner surface that defines a hollow raceway and a first opening extending through the sidewall in communication with the hollow raceway of the utility pole;

a bottom surface positioned inside the hollow raceway of the utility pole proximate the first opening; and a support member adapted to support the bottom surface inside the hollow raceway of the utility pole.

17. The wildlife habitat of claim 16, wherein the bottom surface comprises at least one of concrete, rubber, wood, polystyrene, plastic, metal, and expandable foam.

18. The apparatus of claim 16, further comprising a perch positioned proximate the first opening.

19. A wildlife habitat, comprising:

a pole having a sidewall with an inner surface that defines a hollow raceway and a first opening extending through the sidewall in communication with the hollow raceway of the pole;

a bottom surface positioned inside the hollow raceway of the pole proximate the first opening, wherein the bottom surface is a section of wood having a length less than the length of the pole, and the section of wood extends above and below the first opening; and a support member adapted to support the bottom surface inside the hollow raceway of the pole.

20. A method for constructing a wildlife habitat, comprising:

forming at least a first opening in a sidewall of a utility pole for supporting at least one of electrical power delivery equipment, area lighting equipment, and communication equipment, the utility pole having an inner surface that defines a hollow raceway, wherein the first opening communicates with the hollow raceway; and providing a bottom surface inside the hollow raceway of the utility pole proximate the first opening.

21. The method of claim 20, further comprising providing a top surface inside the hollow raceway above the first opening in the utility pole.

22. The method of claim 20, wherein forming the first opening in the utility pole comprises drilling the first opening.

23. The method of claim 20, wherein forming the first opening comprises forming the first opening with a mold filler.

24. The method of claim 20, wherein providing the bottom surface comprises providing the bottom surface constructed of at least one of concrete, rubber, wood, polystyrene, plastic, metal, and expandable foam.

25. The method of claim 20, wherein providing the bottom surface comprises injecting expandable foam inside the hollow raceway through the first opening in the utility pole with the expandable foam contacting at least a portion of the inner surface of the pole.

26. The method of claim 20, wherein providing the bottom surface comprises inserting at least one bolt into the hollow raceway through at least a second opening in the utility pole to support the bottom surface.

27. The method of claim 20, wherein providing the bottom surface comprises inserting a first and second bolt through at least a second and third opening in the utility pole with at least a portion of the first and second bolts positioned inside the hollow raceway, the first and second portions being of a length sufficient that the first bolt overlaps the second bolt.

28. The method of claim 20, wherein the utility pole is tapered along its length, and the bottom surface is provided with internal dimensions that are slightly larger than the internal dimensions of at least a portion of the hollow raceway, and wherein providing the bottom surface comprises wedging the bottom surface inside the hollow raceway against the inner surface of the utility pole.

29. The method of claim 20, wherein providing the bottom surface comprises applying an adhesive between at least a portion of the inner surface of the utility pole and a portion of an outer edge of the bottom surface.

30. The method of claim 20, wherein providing the bottom surface comprises inserting the bottom surface through a first end of the utility pole and guiding the bottom surface through the hollow raceway.

31. The method of claim 20, further comprising positioning a perch proximate the first opening.

32. A method for constructing a wildlife habitat, comprising:

forming at least a first opening in a sidewall of a pole with an inner surface that defines a hollow raceway, wherein the first opening communicates with the hollow raceway; and providing a bottom surface inside the hollow raceway of the pole proximate the first opening, wherein providing the bottom surface comprises supporting the bottom surface with a balloon that is inserted through a second opening in the pole and inflated to fill at least a portion of the hollow raceway.

33. A method for constructing a wildlife habitat, comprising:

forming at least a first opening in a sidewall of a pole with an inner surface that defines a hollow raceway, wherein the first opening communicates with the hollow raceway; and providing a bottom surface inside the hollow raceway of the pole proximate the first opening, wherein providing the bottom surface comprises inserting a wood section having a length less than the length of the pole into the hollow raceway extending above and below the first opening.

* * * * *